(12) United States Patent
Dunfee, II et al.

(10) Patent No.: US 10,065,649 B2
(45) Date of Patent: *Sep. 4, 2018

(54) METHOD FOR NON-MICROSLIP BASED DUAL CLUTCH TRANSMISSION POWER ON UP SHIFT

(71) Applicant: Eaton Cummins Automated Transmission Technologies LLC, Indianapolis, IN (US)

(72) Inventors: Jeffrey S. Dunfee, II, Kalamazoo, MI (US); Andrew Hart, Solihull (GB); Simon Fitzgerald, Kellyville (AU); Michael Gallion, Warwick (GB)

(73) Assignee: Eaton Corporation, Cleaveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,357

(22) Filed: May 23, 2016

(65) Prior Publication Data

US 2016/0264146 A1  Sep. 15, 2016

Related U.S. Application Data

(63) Continuation of application No. 14/333,264, filed on Jul. 16, 2014, now Pat. No. 9,365,206.

(60) Provisional application No. 61/847,245, filed on Jul. 17, 2013.

(51) Int. Cl.
| | |
|---|---|
| *B60W 30/19* | (2012.01) |
| *B60W 10/02* | (2006.01) |
| *F16D 48/06* | (2006.01) |
| *B60W 30/18* | (2012.01) |

(Continued)

(52) U.S. Cl.
CPC .......... *B60W 30/19* (2013.01); *B60W 10/02* (2013.01); *B60W 10/06* (2013.01); *B60W 10/113* (2013.01); *B60W 30/18* (2013.01); *F16D 48/06* (2013.01); *B60W 2510/0241* (2013.01); *B60W 2510/0275* (2013.01); *B60W 2510/0638* (2013.01); *B60W 2510/0657* (2013.01); *B60W 2710/027* (2013.01); *F16D 2500/106* (2013.01); *F16D 2500/10412* (2013.01);

(Continued)

(58) Field of Classification Search
None
See application file for complete search history.

(56) References Cited

U.S. PATENT DOCUMENTS

| | | | |
|---|---|---|---|
| 9,365,206 B2 * | 6/2016 | Dunfee, II | ........... B60W 10/113 |
| 2004/0166990 A1 | 8/2004 | Buchanan et al. | |
| 2010/0004092 A1 | 1/2010 | Glatthaar et al. | |

(Continued)

*Primary Examiner* — Ramya Prakasam Burgess
*Assistant Examiner* — Timothy Hannon
(74) *Attorney, Agent, or Firm* — Fishman Stewart PLLC

(57) ABSTRACT

A method of controlling a dual clutch transmission power on up shift including an on-coming clutch and an off-going clutch. The method includes implementing a prep phase comprised of decreasing torque on the off-going clutch, monitoring the off-going clutch speed to determine a slip point, and adding a bump torque to the off-going clutch when the off-going clutch reaches the slip point. The method implements a torque phase transferring torque from the off-going clutch to the on-coming clutch by increasing torque on the on-coming clutch towards an engine torque, decreasing torque on the off-going clutch, and simultaneously keeping the combination of torques greater than the slip point.

20 Claims, 3 Drawing Sheets

(51) Int. Cl.
*B60W 10/113* (2012.01)
*B60W 10/06* (2006.01)

(52) U.S. Cl.
CPC .............. *F16D 2500/30406* (2013.01); *F16D 2500/50653* (2013.01); *Y10T 477/6403* (2015.01)

(56) References Cited

U.S. PATENT DOCUMENTS

| | | | |
|---|---|---|---|
| 2011/0263383 A1* | 10/2011 | Ostberg | F16H 61/688 477/174 |
| 2011/0307150 A1 | 12/2011 | Jiang et al. | |
| 2012/0316738 A1 | 12/2012 | Teslak et al. | |
| 2015/0344025 A1* | 12/2015 | Park | B60K 6/48 701/22 |

* cited by examiner

METHOD FOR NON-MICROSLIP BASED DUAL CLUTCH TRANSMISSION POWER ON UP SHIFT

CROSS-REFERENCE TO RELATED APPLICATIONS

This Application is a Continuation of U.S. patent application Ser. No. 14/333,264, filed on Jul. 16, 2014, which claims the benefit of U.S. Provisional Patent Application No. 61/847,245, filed on Jul. 17, 2013, both of which are hereby incorporated by reference in their entirety.

BACKGROUND

Vehicles incorporating automatic transmissions shift automatically between gears in the transmission in response to changes in the throttle. For example, when a driver adjusts an accelerator pedal, these changes adjust the automatic transmission to find the appropriate gear. There are different types of shifting scenarios including power on/off upshifting and power on/off downshifting. Power On shifting refers to shifting into a higher gear (upshifting) or a lower gear (downshifting) when the accelerator pedal is depressed. Power Off shifting refers to shifting into a higher gear (upshifting) or a lower gear (downshifting) when the accelerator pedal is released.

One form of automatic transmissions utilizes a dual clutch in order to shift between gears. In these dual clutch transmissions, there is commonly an off-going clutch that is engaged to and driving the present gear and an on-coming clutch that is used to engage the gear to be shifted into (upshifting or downshifting). It is necessary to balance torque between the on-coming and off-going clutches in order to provide a smooth shift quality. Some systems utilize a process where the off-going clutch is ramped down to induce a continuous microslip. This microslip is used to determine an appropriate torque to apply to the on-coming clutch. The use of this microslip technique accounts dynamically for engine torque and clutch torque errors as well as I-alpha components.

In commercial vehicles utilizing dual clutch transmissions, it may be desirable to utilize a technique other than a sustained microslip technique. This may additionally be desirable in commercial vehicles having deep shift ratios and flexible drivelines as compared to standard automobiles. In commercial vehicles with an off-going gear ratio equal to or greater than 4, a technique other than microslip may also be highly desirable for improving shift quality.

BRIEF DESCRIPTION OF THE DRAWINGS

Referring now to the drawings, exemplary illustrations are shown in detail. Although the drawings represent representative examples, the drawings are not necessarily to scale and certain features may be exaggerated to better illustrate and explain an innovative aspect of an illustrative example. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows.

DETAILED DESCRIPTION

A dual clutch transmission in a commercial vehicle may incorporate the capability to power on upshift between gears having relatively large gear ratio step sizes. It would be desirable for this shifting to provide a quick and smooth shift quality even when shifting between large gear ratios. To accomplish such shift quality, the dual clutch transmission may employ exemplary prep phase techniques to quickly determine shifting parameters. In addition, the dual clutch transmission may employ exemplary torque phase techniques to transfer from an off-going clutch to an on-coming clutch.

An exemplary prep phase technique may include a decrease in the torque of the off-going clutch while monitoring the off-going clutch speed. During a power on upshift, this will result in a sudden dip in off-going clutch speed when a slip point is reached. When this slip point is reached, this exemplary technique applies a bump torque to the off-going clutch to re-engage the clutch. The slip point is used in an exemplary torque phase technique. The exemplary torque phase technique increases torque to the on-coming clutch while simultaneously decreasing torque to the off-going clutch. The combination of the off-going clutch torque and the on-coming clutch torque is maintained above the slip point during this torque handover. This allows a quick and smooth transition between the off-going clutch and the on-coming clutch during power on upshifting.

Figure 1:
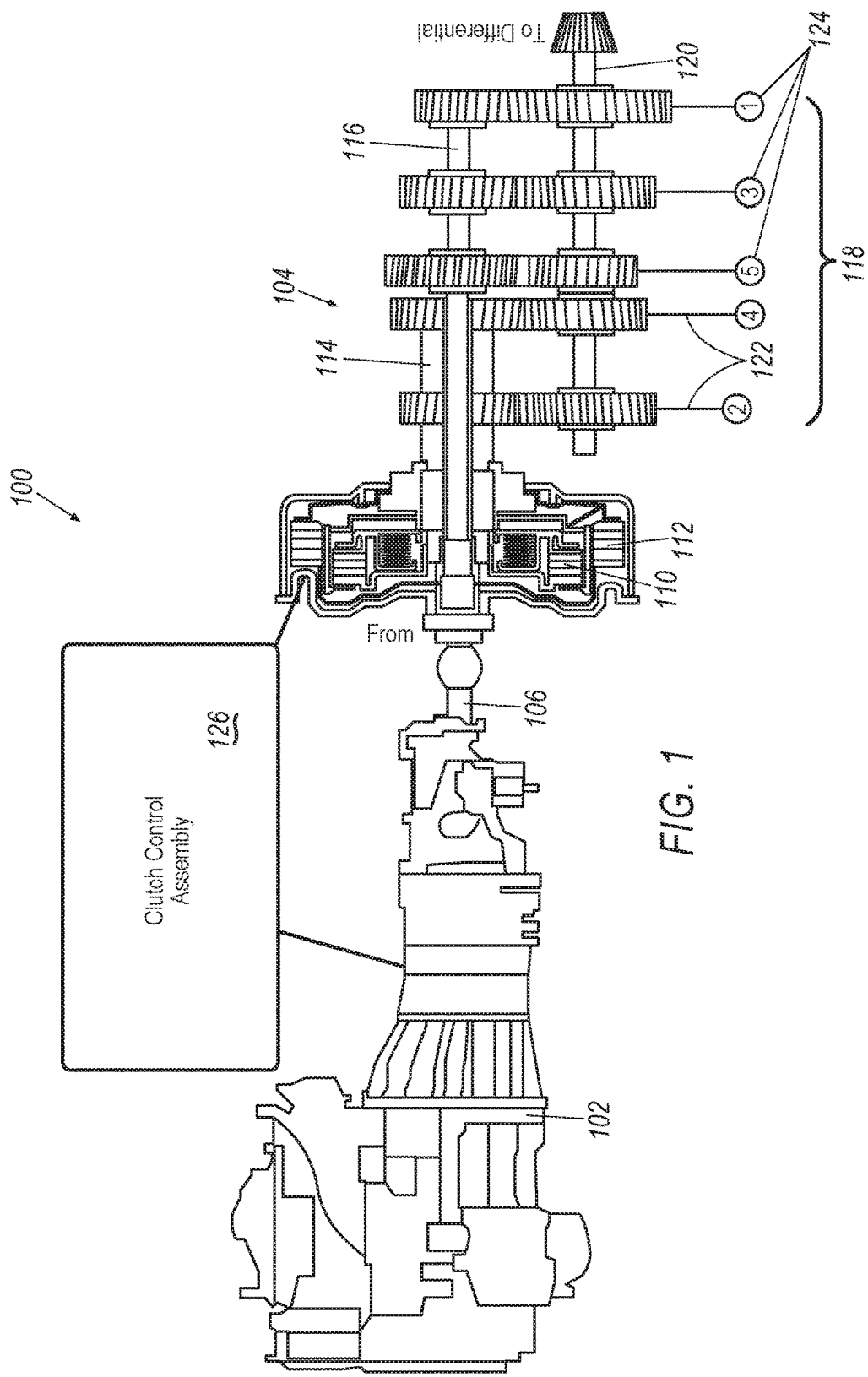
FIG. 1 is an exemplary illustration of a dual clutch transmission.

Referring now to FIG. 1, an engine driveline assembly 100 for a vehicle is shown. The driveline assembly 100 generally may include an engine 102 connected to a dual clutch transmission assembly 104 by way of a crankshaft 106. In an exemplary arrangement, the dual clutch transmission assembly 104 includes a clutch case 108 housing a first clutch 110 and a second clutch 112. In this exemplary example, the first clutch 110 communicates with a first (outer) transmission shaft 114 and the second clutch 112 communicates with a second (inner) transmission shaft 116. It should be understood that the illustrated first and second transmission shaft 114, 116 arrangements are illustrative only and do not limit the present disclosure. A plurality of transmission gears 118 are in communication with the first and second transmission shafts 114, 116 as well as a drivetrain 120 in order to selectively transfer drive from the engine 102 to the drivetrain 120. In at least one exemplary illustration, even transmission gears 122 are in communication with the first transmission shaft 114 and therefore the first clutch 110 and the odd transmission gears 124 are in communication with the second transmission shaft 116 and therefore the second clutch 112. A clutch control assembly 126 is in communication with the dual clutch transmission assembly 104 and with the engine 102 to control operation of the engine drive assembly and the selection of specific transmission gears 118.

When the system experiences a power on upshift, where the accelerator pedal is pressed and a higher gear is desired, the clutch control assembly 126 must facilitate the transition between an off-going clutch and an on-coming clutch. In the above exemplary example, if an upshift from second gear to third gear is needed during acceleration, the clutch control assembly 126 must transition from the first clutch (off-going) 110 to the second clutch (on-coming) 112. This is accomplished by removing the torque from the off-going clutch and increasing torque on the on-coming clutch. However, when experiencing shifts between large gear rations, such as those equal to or greater than four (4), this transition or handoff may become challenging to accomplish quickly and smoothly. An exemplary approach is provided that provides a quick and smooth transition between an off-going clutch and an on-coming clutch.

Figure 2:
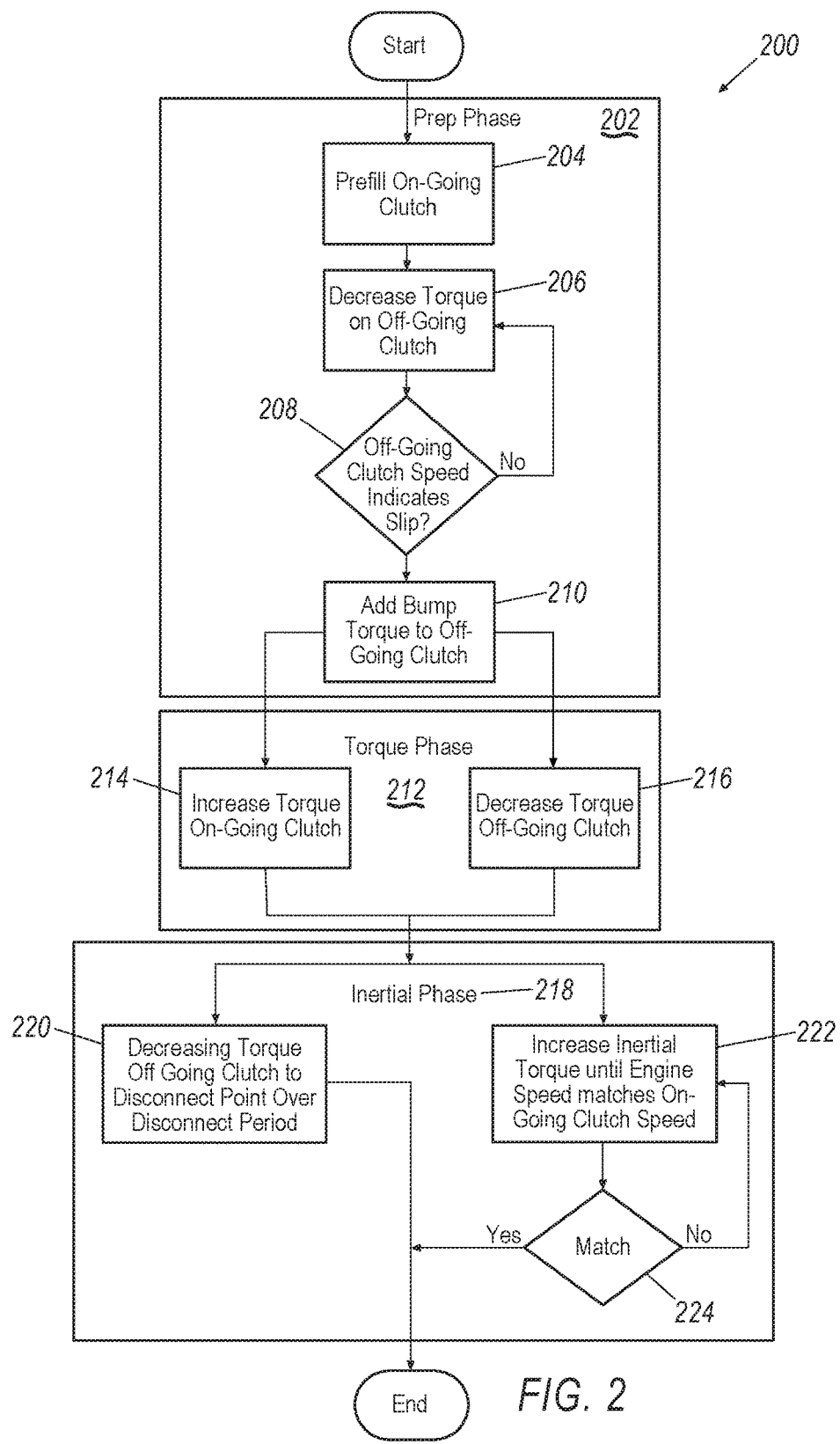
FIG. 2 is a diagram illustrating an exemplary method of controlling a dual clutch transmission.
Figure 3:
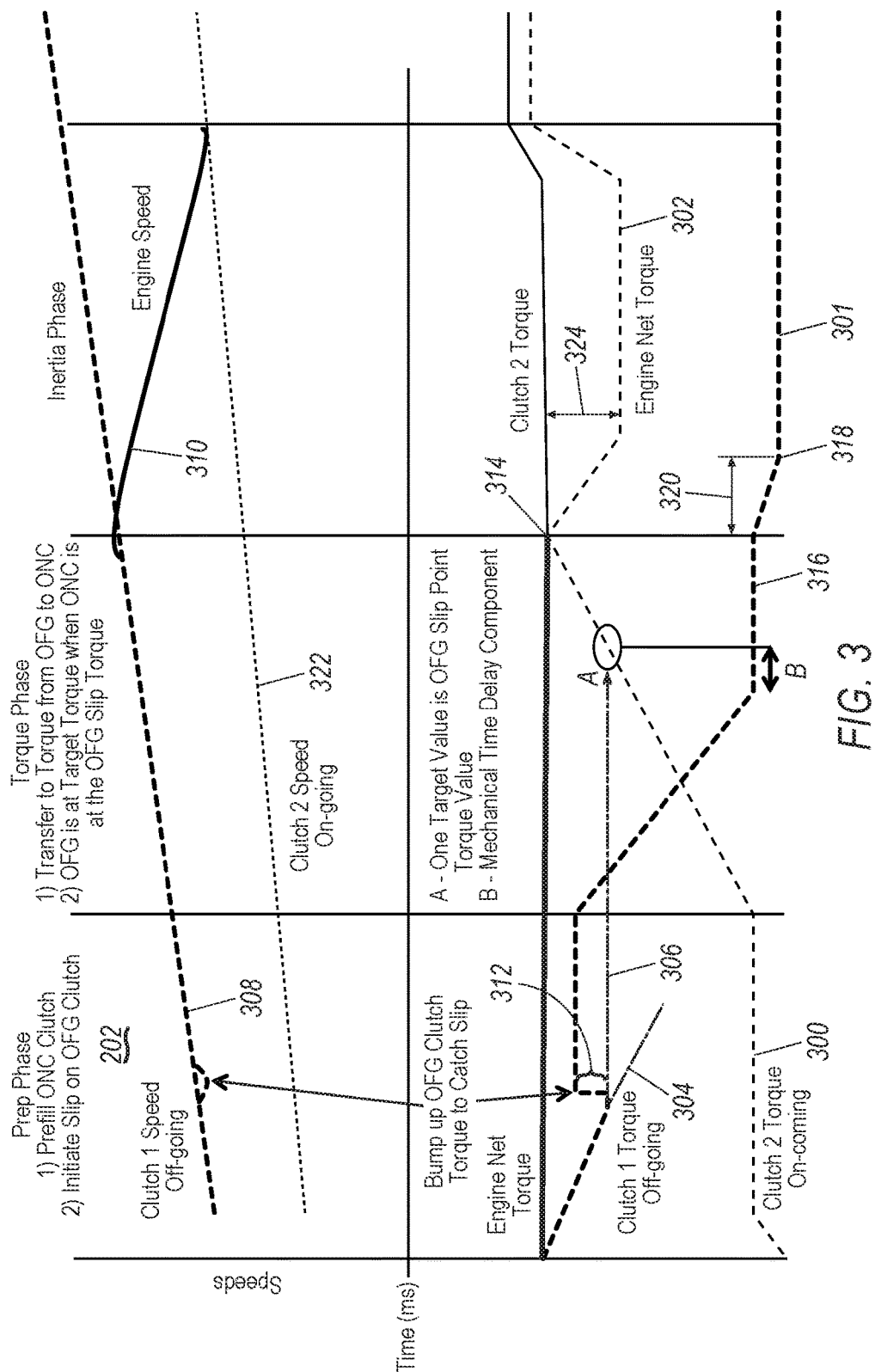
FIG. 3 is a graphical illustration of the exemplary method shown in FIG. 2.

Referring now to FIGS. 2 and 3, an exemplary approach for operation of dual clutch transmission 200 is provided. For the purposes of simplicity, method steps (200) will refer to FIG. 2 and elements (300) will refer to FIG. 3. The method includes an initial prep phase 202. In this prep phase 202 an on-coming clutch pre-fill step 204 is performed. The clutch pre-fill step 204 increases the torque on the on-coming clutch 112 up to a pre-fill level 300. In one exemplary example the pre-fill torque may be a plate-touch-point torque, which is the torque transmitted by the clutch when the clutch plates come into initial contact. In another exemplary example, the pre-fill torque may be between 50 nm to 200 nm. The prep phase 202 includes the step of decreasing the off-going clutch torque 206 (off-going clutch torque 301). This may be accomplished in a variety of ways. In one exemplary example, the off-going clutch 110 has its torque decreased linearly towards an estimated slip point with an approximated value of (engine torque 302—on-coming clutch pre-fill torque 300—a gear offset torque 304). The gear offset torque 304 is simply a gear dependent offset value or error value that provides an additional range to ensure slip occurs. It should be understood that these values (engine torque 302, on-coming clutch pre-fill torque 300, a gear offset torque 304) are not values that need to be monitored in real time. The exemplary example only needs to monitor slippage of the off-going clutch 110 to d-going etermine the relevant slippage.

In this step the torque of the off clutch 110 is decreased until the off-going clutch 110 experiences a slip relative to the engine 102 referred to as a slip point 306. This is accomplished through slip monitoring step 208. Although this may be determined in a variety of fashions, one exemplary example contemplates monitoring the off-going clutch speed 308. When slippage occurs during power on situations, the off-going clutch 110 will indicate a sudden drop in speed relative to the engine speed 310. It is further contemplated that the engine speed 310 could be monitored as it will reflect a sudden increase relative to the clutch speed in power on situations when slippage occurs. Upon the determination of slippage occurring, the method includes the step of adding a bump torque to the off-going clutch 210 to stop the slippage immediately. The bump torque 312 may be any incremental torque to overcome the slippage. In at least one exemplary example, the bump torque 312 may be gear dependent such as the gear offset torque 304.

The prep phase 202 allows the clutch controller 126 to determine the slip point 306 that reflects the torque necessary to prevent clutch slippage. In an exemplary example, the on-coming clutch 112 reaches the pre-fill level 300 prior to the off-going clutch 110 experiencing slippage. This allows the slip point 306 to accurately reflect that joint torque combination of the first and second clutches 110,112 that prevent slippage from occurring. This slip point 306 is then used as the method moves into the torque phase 212. The torque phase 212 controls the handover or transfer of torque control from the off-going clutch 110 to the on-coming clutch 112. This is accomplished by simultaneously increasing torque to the on-coming clutch 214 while decreasing torque to the off-going clutch 216. In the exemplary example, the off-going clutch 110 has its torque decreased linearly while the on-coming clutch 112 has its torque increased linearly such that the combination of torques at all times is greater than the slip point 306.

In an exemplary example the on-coming clutch 112 has its torque increased by directing it toward an engine torque engagement point 314. The engagement point 314 represents the engine torque 302+a feed forward engine torque+ an engine flare feedback. Feed forward engine torque represents the change in engine torque based on any changes in the throttle during the process of increasing torque on the on-coming clutch 112. Engine flare feedback is an adjustment performed by monitoring engine speed 310 and adjusting the increase in torque of the on-coming clutch 112 to eliminate such flare (sudden increase in speed). This provides a smooth transition of the on-coming clutch 112 to the engine torque engagement point 314. At the same time, the off-going clutch 110 is being decreased towards a baseline off-going clutch torque 316. This represents a calibrated minimum off-going clutch torque. In one exemplary example the off-going clutch torque 316 is arrived at prior to the on-coming clutch 112 reaching the engine torque engagement point 314. In addition, in another exemplary example, the off-going clutch torque 316 is arrived at prior to the on-coming clutch 112 reaching the slip point 306. This provides a smooth and reliable handover of torque from the off-going clutch 110 to the on-coming clutch 112.

Finally, the illustrative approach 200 may enter an inertial phase 218 wherein the on-coming clutch 112 takes complete control and the off-going clutch 110 can be moved into an unlocked condition. In the inertial phase 218, the off-going clutch disconnect 220 may be accomplished by decreasing the off-going clutch torque 301 to an off-going clutch disconnect point 318 over a disconnect period 320. The horizontal axis in FIG. 3 represents time in milliseconds. In one exemplary example the disconnect period is a function of the particular transmission gear 112 that the off-going clutch 110 is engaged to. In another exemplary example, the disconnect period 320 may be a period between 10 ms to 200 ms. The disconnect period 320 is utilized to prevent unwanted oscillations of the off-going clutch 110 during the disconnect transition.

The inertial phase 218 further contemplates adjusting the on-coming clutch speed 322 to match the engine speed 310. This is accomplished by inducing an inertial torque step 222 wherein the inertial torque 324 is increased and a speed comparing step 224 where the engine speed 310 is compared to the on-coming clutch speed 322. The inertial torque 324 is a net negative torque imparted to the engine by increasing the torque of the on-coming clutch 112. As the on-coming clutch torque 300 is increased over the engine torque engagement point 314, the engine torque 302 decreases. This allows the engine speed 310 to be gradually reduced until it comes into alignment with the increasing on-coming clutch speed 322. This further produces a smooth and reliable shift even during power on upshifting and even when the gearing ratios may be high. The exemplary method for dual clutch transmission 200 provides a smooth and reliable handover from the off-going clutch 110 to the on-coming clutch 112 without the need to induce microslip into the off-going clutch 110 prior to transitioning.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of controlling a dual clutch transmission, comprising, during a prep phase:
    decreasing torque on an off-going clutch;
    determining a slip point of the off-going clutch; and
    adding a bump torque to the off-going clutch when the off-going clutch begins to slip at a slip point, the bump torque preventing any further off-going slip.

2. The method of claim 1, further comprising, during a torque phase that is subsequent to the prep phase:
    increasing torque on an on-coming clutch;
    decreasing torque on the off-going clutch; and
    as an off-going clutch torque is decreasing, controlling the dual clutch transmission so that a combination of an on-coming clutch torque added to the off-going clutch torque remains greater than the slip point.

3. The method of claim 2, wherein increasing torque on the on-coming clutch during the torque phase comprises increasing torque on the on-coming clutch towards an engine torque engagement point that is determined based on an engine torque, a feed-forward engine torque, and an engine flare feedback.

4. The method of claim 2, wherein decreasing torque on the off-going clutch during the torque phase comprises decreasing torque on the off-going clutch towards a baseline minimum off-going clutch torque that is arrived at prior to the on-coming clutch reaching the slip point.

5. The method of claim 2, further comprising implementing an inertial phase subsequent to the torque phase, the inertial phase comprising increasing an inertial torque until an engine speed matches an on-coming clutch speed.

6. The method of claim 5, the inertial phase further comprising decreasing torque on the off-going clutch towards an off-going clutch disconnect point over a disconnect period between 10 ms and 200 ms.

7. The method of claim 1, wherein the prep phase further comprises increasing torque on the on-coming clutch to a pre-fill torque, wherein the pre-fill torque comprises a plate-touch-point torque that is a torque transmitted when clutch plates come into an initial contact.

8. The method of claim 7, wherein the on-coming clutch reaches the pre-fill torque prior to the off-going clutch reaching the slip point.

9. The method of claim 1, wherein decreasing torque on the off-going clutch to the slip point comprises decreasing torque on the off-going clutch towards an estimated slip point that occurs when the off-going clutch dips in speed, the estimated slip point estimated based on one of the engine torque, the on-coming clutch pre-fill torque, and a gear offset torque.

10. A dual clutch transmission comprising:
    a first clutch;
    a second clutch;
    a clutch control assembly in communication with the first clutch and the second clutch, the clutch control assembly configured to power on up shift by:
    decreasing torque on the first clutch;
    determining a slip point that occurs when slip is initiated on the first clutch; and
    adding a bump torque to the first clutch when the first clutch reaches the slip point, the bump torque preventing any further slip of the first clutch.

11. The dual clutch transmission of claim 10, wherein the clutch control assembly is configured to power on up shift by transferring torque between the first clutch and the second clutch by simultaneously decreasing a first clutch torque and increasing a second clutch torque such that a combination of the first clutch torque and the second clutch torque remains greater than the slip point.

12. The dual clutch transmission of claim 11, wherein the clutch control assembly transfers torque between the first clutch and the second clutch using the steps of:
    determining a speed when an engine flare occurs; and
    increasing torque on the second clutch towards an engine torque engagement point, the engine torque engagement point determined based on the engine torque, a feed-forward engine torque, and an engine flare feedback.

13. The dual clutch transmission of claim 10, wherein the clutch control assembly is further configured to increase torque on the second clutch to a pre-fill torque prior to determining the slip point.

14. The dual clutch transmission of claim 10, wherein decreasing torque on the first clutch comprises the clutch control assembly linearly decreasing torque on the first clutch towards an estimated slip point, the estimated slip point estimated based on an engine torque, a second clutch pre-fill torque, and a gear offset torque.

15. The dual clutch transmission of claim 10, wherein the clutch control assembly is further configured to decrease torque on the first clutch to a first clutch disengagement over a disengagement period.

16. The dual clutch transmission of claim 15, wherein the disengagement period is configured to dampen oscillations of the first clutch.

17. A system for operating a dual clutch transmission, including a clutch control assembly configured to engage a prep phase comprised of:
    decreasing torque on an off-going clutch;
    determining a slip point, the slip point comprising the off-going clutch torque when slip is initiated; and
    adding a bump torque to the off-going clutch when the off-going clutch reaches the slip point, the bump torque preventing any further off-going clutch slip.

18. The system of claim 17, the clutch control assembly further configured to engage a torque phase subsequent to the prep phase, the torque phase comprising transferring torque between the off-going clutch and an on-coming clutch by simultaneously decreasing an off-going clutch torque and increasing an on-coming clutch torque, wherein the combination of the off-going clutch torque and the on-coming clutch torque remains greater than the slip point.

19. The system as described in claim 18, wherein the clutch control assembly is further configured to engage an inertial phase subsequent to the torque phase, the inertial phase comprising decreasing torque on the off-going clutch over a disengagement period configured to dampen oscillations of the off-going clutch.

20. The system of claim 19, wherein the clutch control assembly is further configured to: determine engine flare based on an engine speed; and
    increase torque on the on-coming clutch towards an engine torque engagement point, the engine torque engagement point comprising determined based on the engine torque, a feed-forward engine torque, and an engine flare feedback.

\* \* \* \* \*